S. A. HOUGH.
BRAKE FOR VEHICLES.
No. 19,112.
Patented Jan. 12, 1858.
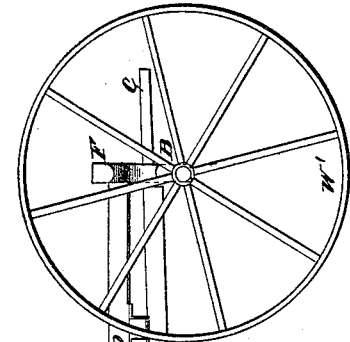
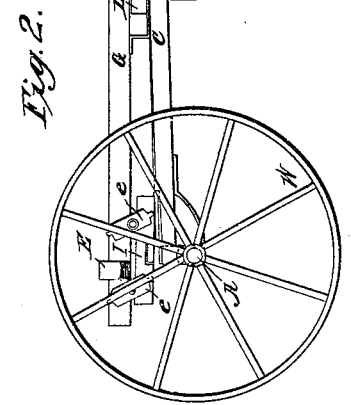
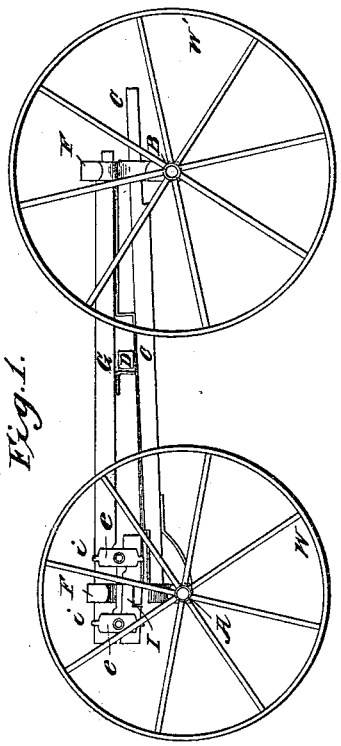
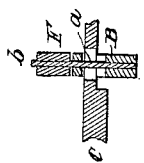
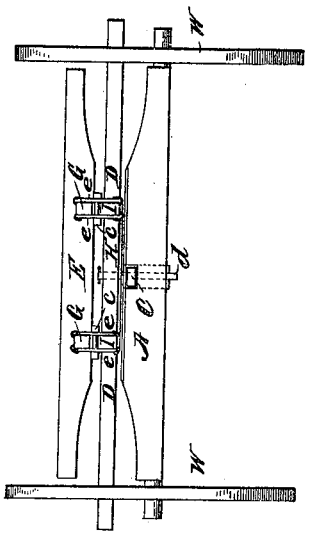
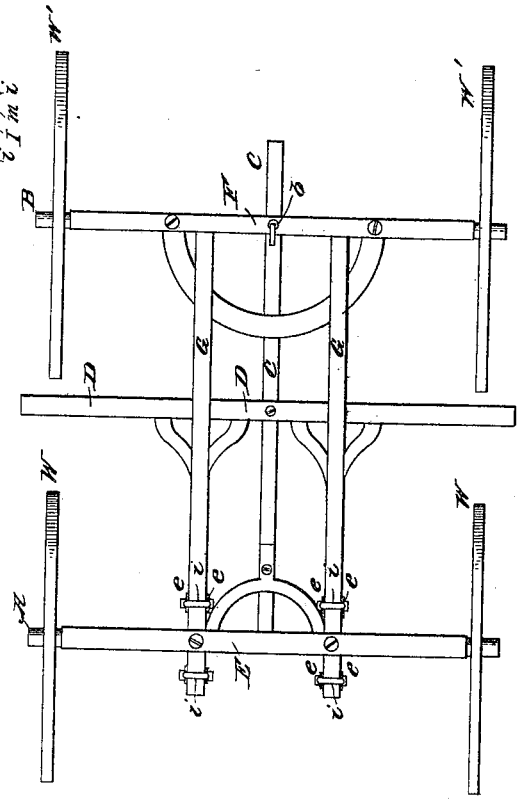

UNITED STATES PATENT OFFICE.

SYLVESTER A. HOUGH, OF OXFORD, GEORGIA, ASSIGNOR TO HIMSELF, AND A. S. HOUGH, OF MADISON, GEORGIA.

WAGON-BRAKE.

Specification of Letters Patent No. 19,112, dated January 12. 1858.

*To all whom it may concern:*

Be it known that I, S. A. HOUGH, of Oxford, in the county of Newton and State of Georgia, have invented a new and useful Improvement in Brakes for Vehicles; and I do hereby declare that the following is a full, clear, and exact description of the construction and operation of the same, reference being had to the annexed drawing, forming part of this specification, in which—

Figure 1 is a side view of the running gear of a vehicle having my improved construction of brake; with rubbers removed from the wheels. Fig. 2 is a similar view; showing rubbers applied. Fig. 3 is a top view, in position of Fig. 1. Fig. 4 is a rear elevation.

Similar characters of reference in the several figures denote the same part.

The character of brake to which my invention refers is that in which the rubbers are applied by the action of the gravity of the load.

It consists in constructing the running gear with a secondary frame attached to the front axle and connected with the main frame by a peculiar combination of devices hereinafter to be set forth.

In the drawing A is the front and B the rear axle.

W W' are the wheels, and C is the coupling pole. This pole has a slot $a$ in its rear portion through which the bolt $b$ connecting it with the rear axle, passes. The rubbing bar D is secured to the pole C, and moves with it.

The front and rear bolsters E and F are rigidly connected by pieces G G; on which frame the load rests. Between the front bolster E and the axle A is a secondary frame consisting of cross piece H and two longitudinal pieces I I; the king bolt $d$ passing through the cross piece H. The longitudinal pieces I and G are separated by rollers $c$ journaled in plates $e$, held against the aforesaid pieces I G by ties $i$, let into the edges of said pieces as shown in detached view. The adjacent edges of the pieces G I are notched as shown in the above mentioned view; the surfaces of said notches $m$ $n$ being portions of cylinders having their axes coincident with the axes of the tie rods $i$, of their respective longitudinal pieces. So that when the frame H I is moved rearward the rollers by which they were separated will be inclosed within the notches $m$ $m$ and $n$ $n$.

The operation of this brake is as follows: When the vehicle is descending a grade the gravity of the load will carry the upper frame consisting of bolsters E F and pieces G G, forward, the rollers $c$ falling into notches $m$ $n$. Bolster F carries the rear axle B with it; slot $a$ permitting this movement. This forward movement of the rear axle, brings wheels W' against the brake bar D, and locks them; the pressure being proportional to the weight of the load. When the level is reached the team draws the pole C forward and with it the bar D. This draws the rollers $c$ out of the notches $m$ $n$, and the vehicle then proceeds as one of ordinary construction.

This construction affords a firm bearing for the load, and at the sime time admits of an ease of action when movement is required, the support of the load continuing the same under all circumstances.

I do not claim applying the brake rubbers by the gravity of the load, broadly considered, as such is not new. But

I claim as an improved construction of running gear for rendering the gravity of the load thus available—

The secondary frame H I, secured to the front axle, in combination with the plates $e$ $e$ connecting the same with the main frame, the rollers $c$ $c$ between the frames, and the notches $m$ $n$ related to the connection of plates and frames as described; when used with a slotted connection of coupling bar and rear axle.

In testimony whereof, I have hereunto signed my name before two subscribing witnesses.

SYLVESTER A. HOUGH.

Witnesses:
GEO. PATTEN,
JOHN S. HOLLINGSHEAD.